United States Patent [19]

Chien et al.

[11] Patent Number: 5,018,153
[45] Date of Patent: May 21, 1991

[54] METHOD AND APPARATUS FOR CORRECTING AMPLITUDE VARIATION IN ELECTRO-OPTIC LASER SYSTEMS

[75] Inventors: Kuei-Ru Chien, Cerritos; Robin A. Reeder, Arleta, both of Calif.; H. Dean Stovall, Las Cruces, N. Mex.

[73] Assignee: Hughes Aircraft Company, Los Angeles, Calif.

[21] Appl. No.: 483,732

[22] Filed: Feb. 23, 1990

[51] Int. Cl.$^5$ ............................................. H01S 3/106
[52] U.S. Cl. ......................................... 372/28; 372/33; 372/105
[58] Field of Search ................. 372/28, 26, 9, 33, 105, 372/106, 98, 18, 12

[56] References Cited

U.S. PATENT DOCUMENTS

| | | |
|---|---|---|
| 3,366,792 | 1/1968 | Ohm ........................ 372/105 |
| 3,407,364 | 10/1968 | Turner ..................... 372/105 |
| 3,910,679 | 10/1975 | Rushworth et al. ......... 372/9 |
| 4,176,327 | 11/1979 | Wayne et al. ............. 372/105 |
| 4,276,518 | 6/1981 | Ferguson .................. 372/26 |
| 4,314,210 | 2/1982 | Everett .................... 372/28 |
| 4,375,684 | 3/1983 | Everett .................... 372/12 |
| 4,408,334 | 10/1983 | Lundstrom ................. 372/105 |
| 4,498,179 | 2/1985 | Wayne et al. ............. 372/106 |
| 4,528,669 | 7/1985 | Bostick et al. ........... 372/26 |
| 4,666,295 | 5/1987 | Duvall, III et al. ....... 372/28 |

OTHER PUBLICATIONS

Hecht and Zajac, *Optics*, Addison-Wesley Co., Reading MA, 1979 pp. 249, 250 and 265.

*Primary Examiner*—Frank Gonzalez
*Assistant Examiner*—Susan S. Morse
*Attorney, Agent, or Firm*—William J. Streeter; Wanda K. Denson-Low

[57] ABSTRACT

A method and apparatus which corrects the amplutide variation in the output in an electro-optic modulated laser system (10). Birefringence within the electro-optic crystal (25) causes elliptical polarization of the linearly polarized laser light (22) produced by the laser gain medium (16), in turn causing a loss in the laser output (27). The loss owing to the elliptical polarization is corrected by either applying a D.C. bias from voltage source (30) directly to the electro-optic crystal (25) or by inserting a quarter-wave plate (32) within the laser's resonant cavity.

18 Claims, 2 Drawing Sheets

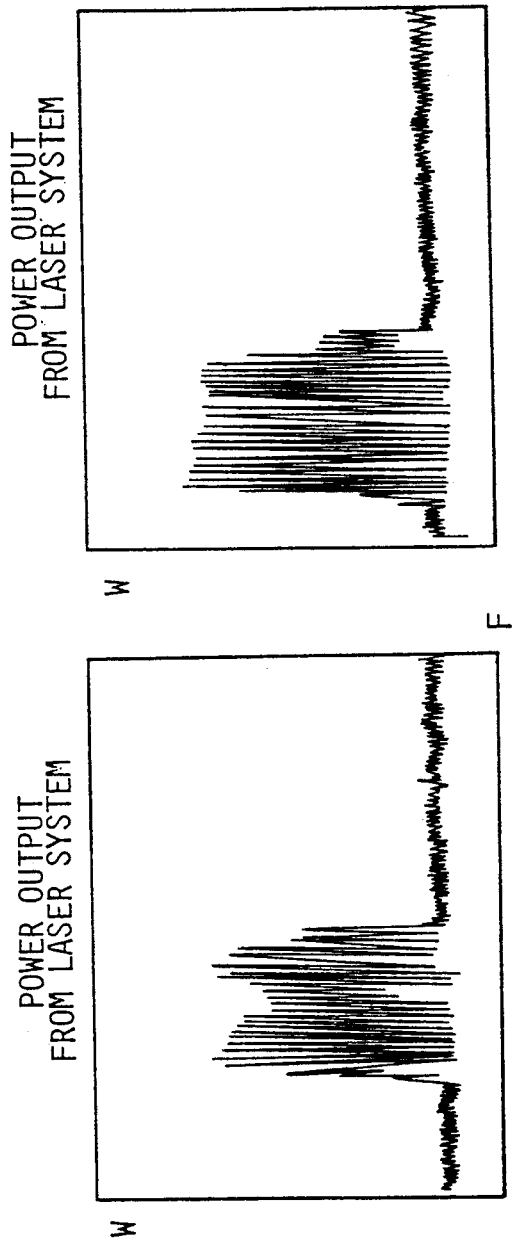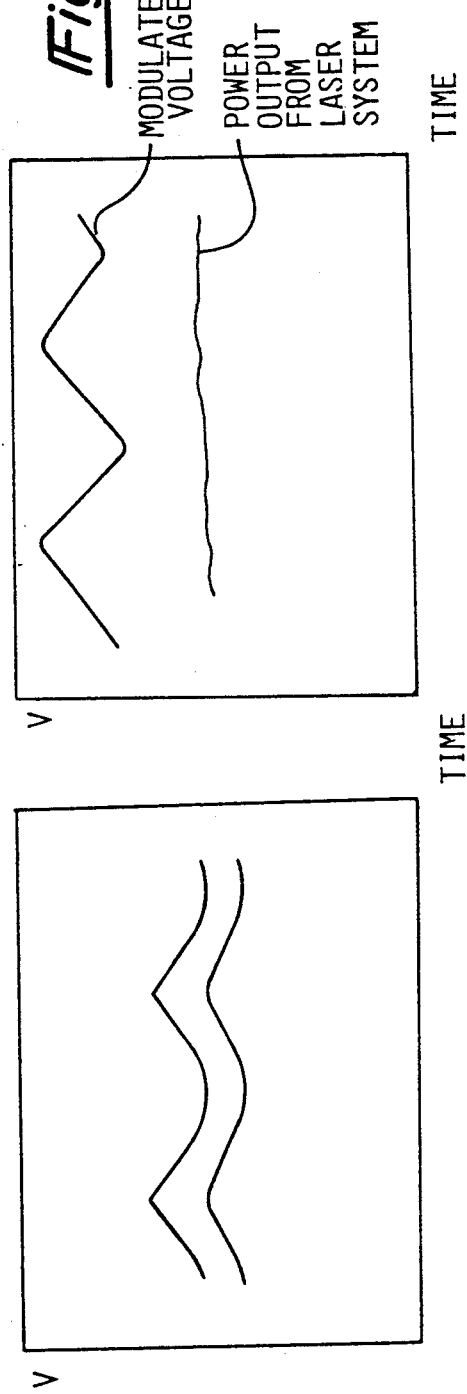

METHOD AND APPARATUS FOR CORRECTING AMPLITUDE VARIATION IN ELECTRO-OPTIC LASER SYSTEMS

BACKGROUND OF THE INVENTION

1. Technical Field

The present invention relates to electro-optic crystal modulated laser systems and, more particularly, it concerns correction of the electro-optic crystal birefringence within the laser system.

2. Discussion

Conventional crystal modulated lasers, such as waveguide $CO_2$ lasers, have an electro-optic crystal positioned within the laser's resonant cavity to frequency modulate the laser light produced by the laser gain medium. This is accomplished by applying a periodically changing voltage to the crystal. The periodically changing voltage causes the index of refraction of the crystal to change in synchronism with the modulation voltage. This changes the effective optical length of the laser resonator, causing the frequency of the laser light to be modulated.

The linear FM chirp laser, as disclosed in U.S. Pat. No. 4,666,295, which is incorporated by reference herein, is an example of a crystal modulated laser which produces a frequency-chirped output from the $CO_2$ waveguide laser by applying voltage to an intra-cavity FM-cut CdTe electro-optic modulator. The applied voltage changes the refraction index of the crystal which, in turn, produces the FM chirp. This linear FM chirp laser system is deployed within a laser radar system to provide the system with the needed tuning range and linearity for pulse compression.

In accordance with laser principles, the amplitude of the output modulated light or the FM chirp, should change little if the overall frequency excursion is considerably smaller than the gain bandwidth. However, contrary to this principle, the frequency-chirped output produced by the linear FM chirp laser systems have been showing large dips in amplitude in the frequency spectrum. This phenomenon becomes more apparent in the higher gain laser systems.

This laser amplitude variation or AM dip is the result of birefringence in the electro-optic crystal. Birefringence is a property of certain crystals characterized by a different index of refraction for different light polarizations. A highly birefringent crystal can rotate light from one polarization to a different polarization, producing a loss which reduces the laser efficiency. In the case of the linear FM chirp laser, a portion of the linearly polarized laser light within the resonant cavity becomes elliptically polarized upon passage through the FM-cut CdTe crystal. Since the elements within the resonant cavity are linearly polarization-sensitive, the elliptical polarization caused by the birefringence subjects the modulated output to an amplitude loss.

It is found in practice that these large amplitude variations have caused a number of problems in the laser radar systems. For example, the variations make locking the laser frequency extremely difficult. The lockloop within the system relies upon small amplitude changes caused by gain variations to hold the lazing frequency at line center. When the large amplitude variations caused by the crystal birefringence swamp-out the small amplitude changes relied upon by the lockloop, frequency control becomes difficult.

There is no known practical method for correcting the amplitude variation in the modulated output. One method currently being used is to operate the laser while maintaining the crystal at a specific temperature. Since the birefringence within the crystal is generally unknown prior to laser operation, the procedure must be performed experimentally to determine the best working temperature. Through an exhaust of trial and error process, a very narrow temperature range, usually within a half degree, can be found in which the laser will operate with minimal amplitude fluctuation. Because this procedure is extremely time consuming and requires expensive electronic temperature feedback circuits to maintain the temperature within the required range, much of the amplitude variation goes uncorrected.

There is, therefore, a real need to provide an effective method and apparatus for correcting the birefringent induced losses within an electro-optic modulated laser system.

SUMMARY OF THE INVENTION

The present invention greatly improves the amplitude variation in the frequency modulated laser light produced by an electro-optic crystal modulated laser system by compensating for the crystal birefringence within the resonant cavity. The resulting laser system can substantially reduce the amplitude dip in the modulated output without the difficulties involved in controlling the crystal's temperature.

The electro-optic modulated laser system has a laser gain medium to produce linearly polarized laser light and is disposed within a resonant cavity defined by an end reflector and an outcoupler. An electro-optic crystal modulator is positioned in optical alignment between the laser gain medium and the outcoupler within the resonant cavity. Voltage is then applied to the crystal modulator which produces the modulated output. The birefringence within the crystal causes some of the laser light to be elliptically polarized producing a loss which causes variations in the modulated output.

In accordance with the present invention, the amplitude variations in the modulated output are corrected by changing the elliptically polarized light to a linear polarization. This is accomplished by either applying a D.C. bias voltage directly to the electro-optic crystal or by inserting a quarter-wave plate within the resonant cavity between the electro-optic crystal modulator and the outcoupler to reduce the loss due to the birefringence within the crystal. Since the birefringence within the crystal is a generally unknown factor, the D.C. bias voltage applied to the crystal is adjusted until the amplitude loss is at a minimum.

When the quarter-wave plate is inserted within the resonant cavity, or when the D.C. bias voltage is applied to the crystal, the elliptical polarization caused by the crystal birefringence is corrected in such a manner that the output polarization is linear, but tilted at an angle with respect to the light within the resonant cavity. The light is then reflected from the outcoupler to remain within the resonant cavity and passes through the laser system again. At this time, the light is corrected in such a manner that it returns to the original waveguide bore in its original polarized state. Again, since the amount of birefringence in the crystal is an unknown factor, the quarter-wave plate is mounted for rotation so that plate can be adjusted to compensate for the unknown birefringence. Thus, no additional loss in amplitude is observed, and the unwanted laser amplitude variation is corrected.

BRIEF DESCRIPTION OF THE DRAWINGS

Other advantages of the invention will become apparent upon reading the following detailed description and upon reference to drawings, in which:

FIG. 2 is a frequency spectrum of the prior art laser system output showing the amplitude variation in the frequency spectrum;

FIG. 3 is the prior art laser output waveforms showing the amplitude variation in the output;

FIG. 6 is a frequency spectrum of the laser output using the claimed invention; and FIG. 7 is the laser output waveforms using the claimed invention.

DETAILED DESCRIPTION OF THE PREFERRED EMBODIMENT

While the invention will be described in connection with the preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
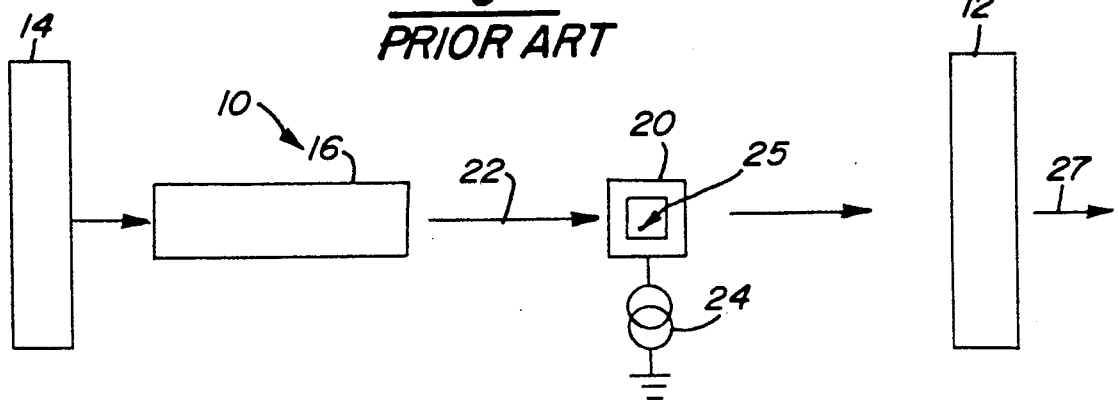
FIG. 1 is a simplified drawing showing a prior art crystal modulated laser system.

Turning now to the drawings, FIG. 1 depicts a block circuit diagram, as described in detail herein, of a conventional frequency modulated laser system, shown generally at 10. The laser gain medium 16 is a waveguide $CO_2$ laser which produces linearly polarized laser light 22, and is located within the resonant cavity defined by the outcoupler 12 and the end reflector 14. An electro-optic crystal modulator 20 utilizing an FM-cut CdTe crystal 25 is located within the resonant cavity between the laser gain medium 16 and the outcoupler 12. A linear voltage ramp generator 24 is applied to the modulator 20 to change the frequency of the laser light 22 and produce the desired output 27. The voltage ramp generator 24, when applied to the modulator 20, changes the index of refraction in the crystal 25, in turn changing the frequency of the laser light 22 within the resonant cavity. The result of the modulation is a frequency-chirped output 27. In one embodiment, the laser system 10 provides a laser radar system with a laser transmitter producing the needed tuning range and linearity for pulse compression.

When the system is in use, the linearly polarized laser light 22 generated by the gain medium 16, passes through the crystal 25 in order to produce the desired linearly polarized output 27. Under ideal conditions, the laser light leaving the crystal 25 should be completely linearly polarized, however, birefringence within the crystal normally causes a portion of the laser light 22 to become elliptically polarized. Birefringence is a property of some crystals in which light passing through the birefringent crystal is changed from one polarization to another, and in the case of the birefringence within the FM-cut CdTe crystal, a portion of the linearly polarized light from the waveguide $CO_2$ laser becomes elliptical. Furthermore, the loss due to birefringence is dependent upon the amount of voltage applied to the crystal 25 by the voltage ramp generator 24 and tends to change accordingly.

The elliptically polarized light produces a loss within the resonant cavity which reduces the amplitude of the laser output 27. This occurs since the end reflector 14 and gain medium 16 are linearly polarization-sensitive elements, and the elliptically polarized laser light within the resonant cavity has a substantial amount of attenuation for its component perpendicular to the linearly polarization-sensitive elements.

FIG. 2 represents a reproduction of the frequency spectrum displayed on a spectrum analyzer of the output 27 from the laser system 10. It should be noted that the frequency spectrum has a significant dip 28 in the amplitude which is caused by the birefringence in the crystal 25. This unwanted dip 28 causes a number of difficulties, particularly when the laser system 10 is deployed within a laser radar system.

The relationship between the voltage ramp generator 24 and the amplitude loss in the laser output 27 is shown in FIG. 3. Note that the output 27 tends to fluctuate with the modulated voltage 29 from voltage ramp generator 24, hence showing the dependence between the modulated voltage and the loss caused by the birefringence within the crystal 25.

Figure 4:
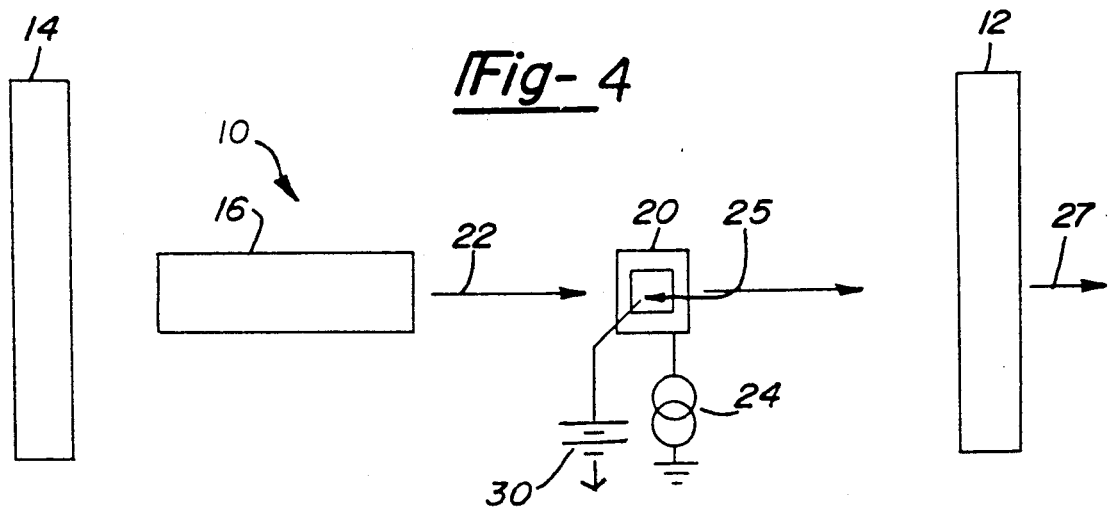
FIG. 4 is a simplified drawing showing one embodiment of the apparatus employed in the present invention for correcting the crystal birefringence within the modulator.

In accordance with one embodiment of the present invention, a D.C. bias from voltage source 30 is applied directly to the crystal 25, as depicted in FIG. 4, in order to compensate for the birefringence within the crystal 25. The magnitude of the D.C. bias applied to the crystal to compensate for the birefringence is of the same order of magnitude as the voltage source applied in the voltage ramp generator 24. With the D.C. bias voltage from voltage source 30 applied to the crystal 25, the birefringence is compensated in such a way that the once elliptically polarized light 26 becomes linearly polarized, but tilted with respect to polarization sensitive elements in the resonant cavity. The linearly polarized light is then reflected off the outcoupler 12 to pass through the system 10, where it is returned to the original waveguide bore 16.

Since the birefringence within different crystals vary, it is difficult to determine the amount of D.C. bias from voltage source 30 needed to correct the birefringence prior to operating a laser. This being the case, the D.C. bias from voltage source 30 applied to the crystal 25 is adjustable whereby the operator of the laser may regulate the amount of voltage source applied to the crystal 25 in order to correct that particular crystal's birefringent loss. The birefringent loss within the crystal is held to a minimum and amplitude dip 28 in the laser output 27 is corrected once the proper bias voltage source is applied to the crystal.

Figure 5:
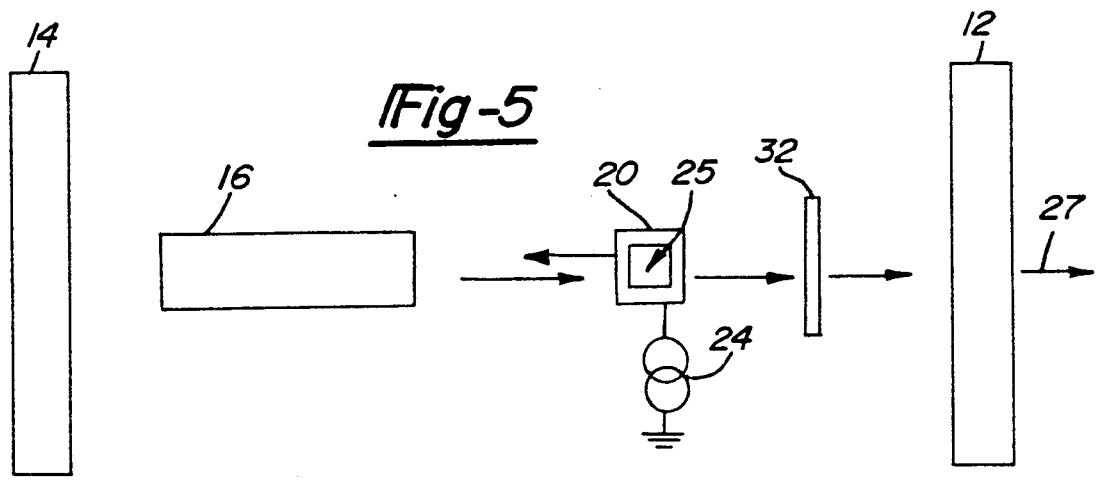
FIG. 5 is a simplified drawing showing another embodiment of the apparatus employed in the present invention for correcting the crystal birefringence within the resonant cavity.

In another embodiment of the present invention, as shown in FIG. 5, a quarter-wave plate 32 is inserted within the resonant cavity between the electro-optic modulator 20 and outcoupler 12. A wave plate is a plate of material which is linearly birefringent, typically made by preparing X-cut sections, of quartz, calcite or other birefringent crystals. Wave plates have a pair of orthogonal axes which are designated fast and slow. When light travels through the wave plate, the component parallel to the fast axis travels faster than the component parallel to the slow axis, causing a phase shift between the components. A quarter-wave plate has a 90° phase shift between the fast component and the slow component. The elliptically polarized light can be considered as composed of two linear components parallel to the major and minor axis of the ellipse. If the axes of the quarter-wave plate are oriented parallel to the axes of the ellipse, the two transmitted components will either have a zero phase difference or 180° phase difference and will be linear. Hence, the quarter-wave plate 32 corrects the elliptically polarized light caused by the birefringence in crystal 25 and outputs light that is linearly polarized, but tilted with respect to the polarization sensitive elements waveguide bore within the resonant cavity. The light is then reflected from the outcoupler 12 and passes through the wave plate 32 and modulator 20 for a second time, correcting the polarization at the entrance to the waveguide bore, i.e., parallel to the wall of the bore.

Once again, since the birefringence within the crystal 25 is an unknown factor, the component axes of elliptically polarized light emitted from the crystal are unknown. Hence, the plate 32 must be adjustable for rotation about the wave plate's 32 optical axes in order to obtain the proper orientation to effectively correct the amplitude dip. In order to accommodate this, the quarter-wave plate 32 is mounted for rotation about an axis parallel to the laser light within the laser system in order to orient the wave plate's 32 optical axes parallel to the axes of the elliptical polarization.

FIG. 6 depicts the frequency spectrum of the output 27 with the D.C. bias voltage source applied to crystal 25 or with the quarter-wave plate 32 inserted within the resonant cavity. Note that there is no longer an amplitude variation 28 in the frequency-chirped output.

FIG. 7 shows the relationship between the modulated voltage ramp generator 24 and the laser output 27 when using the claimed invention. The output 27 is held at a constant level, regardless of the modulated voltage 29 from voltage ramp generator 24.

Another advantage of the present invention is that it allows the laser to be operated at a wider range of temperatures. The following is a chart showing the different laser outputs compared with the crystal temperatures:

| | POWER OUTPUT | | |
|---|---|---|---|
| CRYSTAL TEMP. | WITHOUT QUARTER-WAVE PLATE OR D.C. BIAS | WITH QUARTER-WAVE PLATE | WITH D.C. BIAS VOLTAGE |
| 30° C. | 10 W | 11 W | 11 W |
| 40° C. | 9 W | 11 W | 11 W |
| 50° C. | 0 W | 11 W | 8 W |
| 60° C. | 0 W | 11 W | 8 W |

Since the crystals are susceptible to heating from the laser gain medium, they can easily reach a temperature of 50° C. It should be noted that as the crystal temperature increases above 40° C., the laser efficiency drops considerably without the use of the quarter-wave plate or the D.C. bias voltage.

Thus, it is apparent that there has been provided, in accordance with the invention, a simple, yet effective technique for correcting the amplitude dip in laser system output. While the invention has been described in conjunction with the linear FM chirp laser, it is evident that many alternatives, modifications and variations will be apparent to those skilled in the art, in light of the foregoing description. Accordingly, it is intended to embrace all such alternatives, modifications and variations as fall within the spirit and broad scope of the appended claims.

What is claimed is:

1. A method of correcting the amplitude variation induced by electro-optic crystal birefringence within a laser system, said method comprising the steps of:
    (a) actuating a laser gain medium to emit linearly polarized laser light, said gain medium being disposed within a resonant cavity defined by an end reflector and a partially reflective outcoupler;
    (b) frequency modulating the laser light by passing said light through an electro-optic crystal modulator disposed within the resonant cavity, said modulator being activated by a time varying electrical signal, wherein crystal birefringence in the electro-optic crystal modulator causes elliptical polarization in said linearly polarized light and amplitude variation in said frequency modulated laser light; and
    (c) correcting said amplitude variation by changing said elliptically polarized light to a linear polarization within said resonant cavity.

2. The method of claim 1, wherein step (c) comprises applying a D.C. bias voltage directly to said electro-optic crystal.

3. The method of claim 1, wherein step (c) comprises inserting a quarter-wave plate in optical alignment with said laser light within said resonant cavity.

4. The method of claim 2, additionally comprising the step of adjusting the D.C. bias voltage applied to said crystal until said amplitude variation is held to a minimum.

5. The method of claim 3, additionally comprising the step of adjusting the orientation of said quarter-wave plate by rotating the quarter wave plate about an axis parallel to said laser light until said amplitude variation is held to a minimum.

6. An electro-optic modulated laser system comprising:
    (a) a laser gain medium which emits linearly polarized laser light, said gain medium being disposed within a resonant cavity defined by an end reflector and a partially reflective outcoupler;
    (b) electro-optic crystal modulator means disposed within said resonant cavity in optical alignment with said laser gain medium for frequency modulating said laser light, said modulator being activated by a time varying electrical signal; wherein birefringence in said electro-optic modulator means causes elliptical polarization in said linearly polarized light and amplitude variations in the frequency modulated laser light; and
    (c) correction means for correcting said amplitude variation by changing said elliptically polarized light to a linear polarization within said resonant cavity.

7. A laser system as defined in claim 6, wherein said correcting means comprises a voltage source means for applying a D.C. bias voltage directly to the electro-optic modulator means.

8. A laser system as defined in claim 6, wherein said correction means comprises a quarter-wave plate located within said resonant cavity in optical alignment with said laser light.

9. A laser system as defined in claim 6, wherein said laser gain medium comprises a waveguide $CO_2$ laser.

10. A laser system as defined in claim 6, wherein said electro-optic crystal comprises a FM-cut CdTe crystal.

11. A laser system as defined in claim 6, wherein said frequency modulated laser light comprises a frequency modulated linear chirp.

12. A laser system as defined in claim 6, wherein said electro-optic crystal modulator is modulated by applying a linear voltage ramp generator thereto.

13. A laser system as defined in claim 6, wherein said laser system is used within a laser radar system.

14. A laser system as defined in claim 6 wherein said correction means changes said elliptically polarized light into linear polarized light in which the plane of polarization is tilted with respect to the plane of polarization of said linear polarized light emitted by said laser gain means.

15. A laser system as defined in claim 14 wherein said linearly polarized light coming from said correction means is partially reflected by said outcoupler and is partially transmitted by said outcoupler.

16. A laser system as defined in claim 8, wherein said quarter-wave plate is positioned between said electro-optic modulator means and the crystal outcoupler.

17. A laser system as defined in claim 8, said quarter-wave plate is mounted for rotation about an axis parallel with said laser light within the resonant cavity.

18. A laser system as defined in claim 7, wherein the amount of said D.C. bias voltage applied said electro-optic crystal is adjustable.

* * * * *